United States Patent
Oh et al.

(10) Patent No.: US 9,814,092 B2
(45) Date of Patent: Nov. 7, 2017

(54) FRAME TRANSMISSION METHOD PERFORMED IN ACCESS POINT, FRAME RECEPTION METHOD PERFORMED IN TERMINAL, AND ACCESS POINT

(71) Applicant: Electronics and Telecommunications Research Institute, Daejeon (KR)

(72) Inventors: Jin Hyung Oh, Daejeon (KR); Gwang Zeen Ko, Daejeon (KR); Hyun Duk Kang, Gwangju (KR); Igor Kim, Daejeon (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 14/577,219

(22) Filed: Dec. 19, 2014

(65) Prior Publication Data

US 2015/0181561 A1    Jun. 25, 2015

(30) Foreign Application Priority Data

Dec. 20, 2013 (KR) .................. 10-2013-0160129
Dec. 19, 2014 (KR) .................. 10-2014-0183716

(51) Int. Cl.
*H04W 80/02* (2009.01)
*H04L 1/18* (2006.01)
(Continued)

(52) U.S. Cl.
CPC ........... *H04W 80/02* (2013.01); *H04L 1/1861* (2013.01); *H04W 28/06* (2013.01); *H04W 72/00* (2013.01); *H04W 84/12* (2013.01)

(58) Field of Classification Search
CPC ... H04W 28/06; H04W 28/065; H04W 84/12; H04L 69/04
See application file for complete search history.

(56) References Cited

U.S. PATENT DOCUMENTS 7,039,412 B2 * 5/2006 Sandhu ................. H04L 1/0072
340/10.1
7,463,642 B2 * 12/2008 Qian ..................... H04L 1/1628
370/432

(Continued)

OTHER PUBLICATIONS

Alnuweiri, H.M. et al., "OFDMA-Based Medium Access Control for Next-Generation WLANs," EURASIP Journal on Wireless Communications and Networking, vol. 2009:1-9 (2009).

*Primary Examiner* — Chandrahas Patel
(74) *Attorney, Agent, or Firm* — Nelson Mullins Riley & Scarborough LLP

(57) ABSTRACT

Provided are a frame transmission method performed in an access point (AP), a frame reception method performed in a terminal, and an AP. The frame transmission method performed in an AP includes acquiring a channel for transmitting a first data unit of a first terminal, when a data unit to be transmitted to at least one terminal other than the first terminal is in the AP, generating a physical layer convergence procedure (PLCP) protocol data unit (PPDU) including the first data unit and the data unit to be transmitted to the at least one terminal, and transmitting the PPDU to the first terminal and the at least one terminal. Accordingly, it is possible to improve the performance of a wireless local area network (WLAN).

9 Claims, 14 Drawing Sheets

(51) Int. Cl.
  *H04W 28/06* (2009.01)
  *H04W 72/00* (2009.01)
  *H04W 84/12* (2009.01)

(56) References Cited

U.S. PATENT DOCUMENTS

| | | |
|---|---|---|
| 8,098,632 B2 | 1/2012 | van Rensburg et al. |
| 2009/0190537 A1 | 7/2009 | Hwang et al. |
| 2011/0243025 A1 | 10/2011 | Kim et al. |
| 2013/0142179 A1 | 6/2013 | Jung et al. |

* cited by examiner

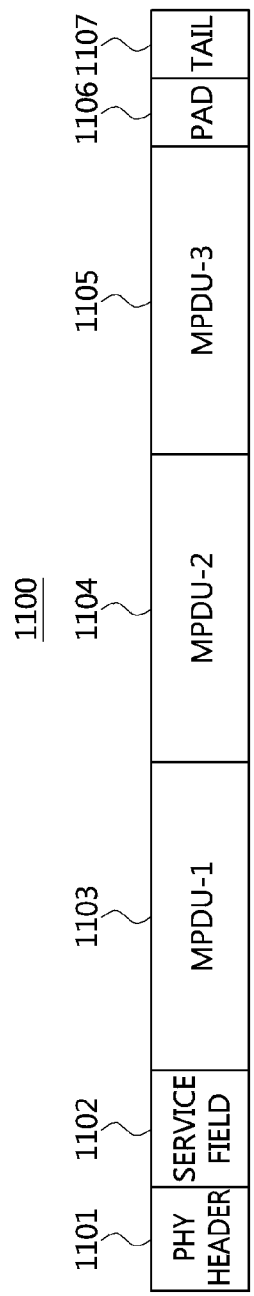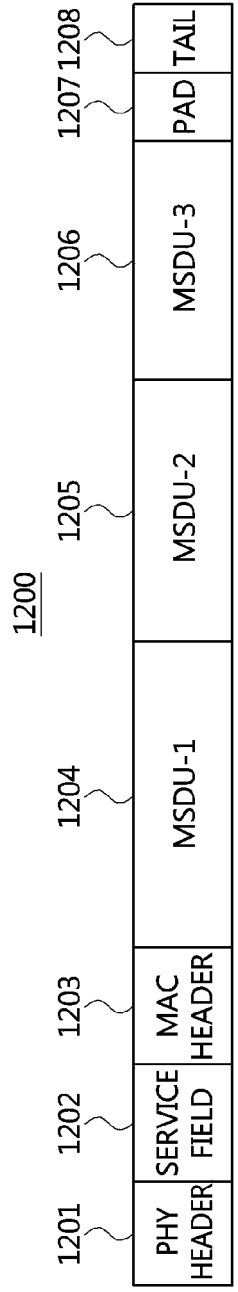

FRAME TRANSMISSION METHOD PERFORMED IN ACCESS POINT, FRAME RECEPTION METHOD PERFORMED IN TERMINAL, AND ACCESS POINT

CLAIM FOR PRIORITY

This application claims priority to and the benefit of Korean Patent Application No. 2013-0160129 filed on Dec. 20, 2013 and No. 2014-0183716 filed on Dec. 19, 2014 in the Korean Intellectual Property Office (KIPO), the entire contents of which are hereby incorporated by reference.

BACKGROUND

1. Technical Field

Example embodiments of the present invention relate in general to wireless local area network (WLAN) technology, and more particularly, to a technology for transmitting and receiving a frame including multiplexed data units.

2. Related Art

With the development of information and communication technology, a variety of wireless communication technologies are under development. Among these, a WLAN is a technology for enabling wireless Internet access through a portable terminal, such as a personal digital assistant (PDA), a laptop computer, a portable multimedia player (PMP), a smart phone, or a tablet personal computer (PC), in a home, a company, or a specific service providing area based on radio frequency technology.

Standards of a WLAN are being developed as the Institute of Electrical and Electronics Engineers (IEEE) 802.11 standards. A WLAN technology conforming to the IEEE 802.11a standard operates based on orthogonal frequency division multiplexing (OFDM), and may provide a maximum transmission rate of 54 Mbps in the 5 GHz band. A WLAN technology conforming to the IEEE 802.11b standard operates based on direct sequence spread spectrum (DSSS), and may provide a maximum transmission rate of 11 Mbps in the 2.4 GHz band. A WLAN technology conforming to the IEEE 802.11g standard operates based on OFDM or DSSS, and may provide a maximum transmission rate of 54 Mbps in the 2.4 GHz band.

A WLAN technology conforming to the IEEE 802.11n standard operates in the 2.4 GHz band and the 5 GHz band based on OFDM, and may provide a maximum transmission rate of 300 Mbps to four spatial streams when multiple-input multiple-output OFDM (MIMO-OFDM) is used. The WLAN technology conforming to the IEEE 802.11n standard may support a channel bandwidth up to 40 MHz, and in this case, it is possible to provide a maximum transmission rate of 600 Mbps.

The prevalence of such a WLAN and the diversification of applications using a WLAN are leading to an increase in the necessity for a new WLAN technology for supporting a higher throughput than the data processing speed supported by IEEE 802.11n. A very high throughput (VHT) WLAN technology is one of the IEEE 802.11 WLAN technologies that have been proposed to support a data processing speed of 1 Gbps or more. Among them, IEEE 802.11ac is under development as a standard for providing a VHT in a band of 5 GHz or less, and IEEE 802.11ad is under development as a standard for providing a VHT in a 60 GHz band.

Recently, the number of stations (STAs) associated to a basic service set (BSS) of a WLAN has been drastically increasing, and collisions between STAs in a BSS have been increasing accordingly. In this situation, a transmission and reception method for efficiently exchanging data between STAs is necessary.

SUMMARY

Accordingly, example embodiments of the present invention are provided to substantially obviate one or more problems due to limitations and disadvantages of the related art.

Example embodiments of the present invention provide a method of transmitting and receiving multiplexed data.

Example embodiments of the present invention also provide an apparatus for transmitting and receiving multiplexed data.

In some example embodiments, a frame transmission method performed in an access point (AP) includes: acquiring a channel for transmitting a first data unit of a first terminal; when a data unit to be transmitted to at least one terminal other than the first terminal is in the AP, generating a physical layer convergence procedure (PLCP) protocol data unit (PPDU) including the first data unit and the data unit to be transmitted to the at least one terminal; and transmitting the PPDU to the first terminal and the at least one terminal.

Here, the PPDU may further include at least one of the lengths of the data units, receiver identifiers (IDs) of the data units, channels in which the data units are transmitted, transmission sections, and transmission spaces.

Here, the first data unit and the data unit to be transmitted to the at least one terminal may be multiplexed in a frequency domain in the PPDU.

Here, the first data unit and the data unit to be transmitted to the at least one terminal may be multiplexed in a time domain in the PPDU.

Here, the first data unit and the data unit to be transmitted to the at least one terminal may be multiplexed in a spatial domain in the PPDU.

Here, the data units may be media access control (MAC) protocol data units (MPDUs) or MAC service data units (MSDUs).

Here, the frame transmission method may further include receiving acknowledgement (ACK) frames which are responses to reception of the PPDU from the first terminal and the at least one terminal.

In other example embodiments, a frame reception method performed in a terminal includes: receiving a PPDU obtained by multiplexing a plurality of data units from an AP; determining whether a first data unit of the terminal is in the PPDU through a signal field included in the PPDU; and when the first data unit is in the PPDU, receiving the first data unit through resources indicated by the signal field.

Here, the signal field may include at least one of the lengths of the plurality of data units, receiver IDs of the plurality of data units, channels in which the plurality of data units are transmitted, transmission sections, and transmission spaces.

Here, the plurality of data units may be multiplexed in a frequency domain in the PPDU.

Here, the plurality of data units may be multiplexed in a time domain in the PPDU.

Here, the plurality of data units may be multiplexed in a spatial domain in the PPDU.

Here, the frame reception method may further include transmitting an ACK frame which is a response to reception of the first data unit to the AP.

In other example embodiments, an AP includes: a processor; and a memory configured to store at least one command executed by the processor. The at least one command is executable to perform operations of: acquiring a channel for transmitting a first data unit of a first terminal; when a data unit to be transmitted to at least one terminal other than the first terminal is in the AP, generating a PPDU including the first data unit and the data unit to be transmitted to the at least one terminal; and transmitting the PPDU to the first terminal and the at least one terminal.

Here, the PPDU may further include at least one of the lengths of the data units, receiver IDs of the data units, channels in which the data units are transmitted, transmission sections, and transmission spaces.

Here, the first data unit and the data unit to be transmitted to the at least one terminal may be multiplexed in a frequency domain in the PPDU.

Here, the first data unit and the data unit to be transmitted to the at least one terminal may be multiplexed in a time domain in the PPDU.

Here, the first data unit and the data unit to be transmitted to the at least one terminal may be multiplexed in a spatial domain in the PPDU.

Here, the data units may be MPDUs or MSDUs.

Here, the at least one command may be executed to further perform an operation of receiving ACK frames which are responses to reception of the PPDU from the first terminal and the at least one terminal.

BRIEF DESCRIPTION OF DRAWINGS

Example embodiments of the present invention will become more apparent by describing in detail example embodiments of the present invention with reference to the accompanying drawings, in which:

FIG. 11 is a block diagram of an example embodiment of a PPDU including MPDUs multiplexed in the time domain;

FIG. 12 is a block diagram of an example embodiment of a PPDU including MDSUs multiplexed in the time domain;

Figure 1:
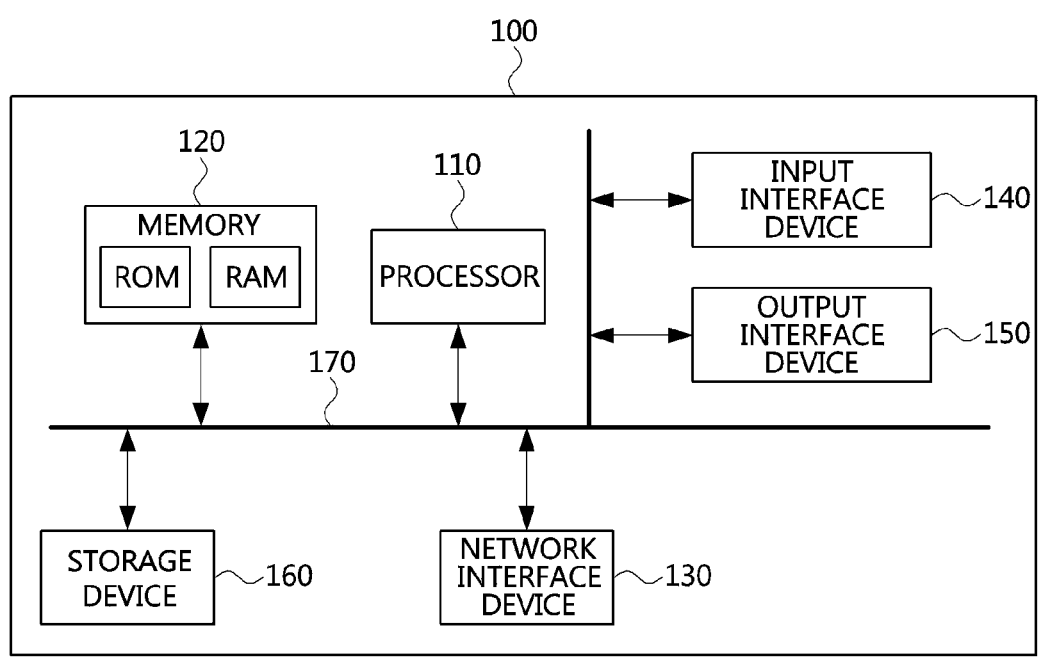
FIG. 1 is a block diagram showing an example embodiment of a station (STA) that performs methods according to the present invention.

DESCRIPTION OF EXAMPLE EMBODIMENTS
OF THE PRESENT INVENTION

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms "first," "second," "A," B," etc. may be used herein in reference to elements of the invention, such elements should not be construed as being limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in greater detail with reference to the accompanying drawings. In order to facilitate general understanding in describing the present invention, the same components in the drawings are denoted with the same reference signs, and repeated description thereof will be omitted.

Throughout this disclosure, a station (STA) denotes an arbitrary functional medium including an Institute of Electrical and Electronics Engineers (IEEE) 802.11-conformant media access control (MAC) and physical layer (PHY) interface for a wireless medium. STAs may be classifies as STAs that are access points (APs) and STAs that are non-APs. A STA that is an AP may be simply referred to as an AP, and a STA that is a non-AP may be simply referred to as a terminal.

A STA may include a processor and a transceiver, and may further include a user interface, a display device, and so on. The processor denotes a unit devised to generate a frame that will be transmitted via a wireless network or to process a frame received via the wireless network, and may perform various functions for controlling the STA. The transceiver is functionally connected to the processor, and denotes a functional unit devised to transmit and receive a frame for the STA via the wireless network.

An AP may be referred to as a centralized controller, a base station (BS), a radio access station, a node B, an evolved node B, a relay, a mobile multihop relay (MMR)-BS, a base transceiver system (BTS), a site controller, etc., and may include all or a part of functions thereof.

A terminal (i.e., non-AP) may be referred to as a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, etc., and may include all or some of functions thereof.

Here, the terminal may denote a desktop computer, a laptop computer, a tablet personal computer (PC), a wireless phone, a mobile phone, a smart phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, etc. capable of communicating.

FIG. 1 is a block diagram showing an example embodiment of a STA that performs methods according to the present invention.

Referring to FIG. 1, a STA 100 may include at least one processor 110, a memory 120, and a network interface device 130 connected to a network to perform communication. Also, the STA 100 may further include an input interface device 140, an output interface device 150, a storage device 160, and so on. Respective components included in the STA 100 may be connected by a bus 170 and communicate with each other.

The processor 110 may execute program commands stored in the memory 120 and/or the storage device 160. The processor 110 may denote a central processing unit (CPU), a graphics processing unit (GPU), or a processor dedicated to performing methods according to example embodiments of the present invention. The memory 120 and the storage device 160 may be volatile storage media and/or non-volatile media. For example, the memory 120 may be a read only memory (ROM) and/or a random access memory (RAM).

Example embodiments of the present invention are applied to wireless local area network (WLAN) systems conforming to IEEE 802.11, and may also be applied to communication systems other than the WLAN systems conforming to IEEE 802.11.

For example, the embodiments of the present invention may be applied to a mobile Internet, such as a wireless personal area network (WPAN), a wireless body area network (WBAN), a wireless broadband Internet (WiBro), or a world interoperability for microwave access (WiMax), a second generation (2G) mobile communication network, such as global system for mobile communication (GSM) or code division multiple access (CDMA), a 3G mobile communication network, such as wideband code division multiple access (WCDMA) or CDMA2000, a 3.5G mobile communication network, such as high speed downlink packet access (HSDPA) or high speed uplink packet access (HSUPA), a 4G mobile communication network, such as long term evolution (LTE) or LTE-Advanced, a 5G mobile communication network, and so on.

Figure 2:
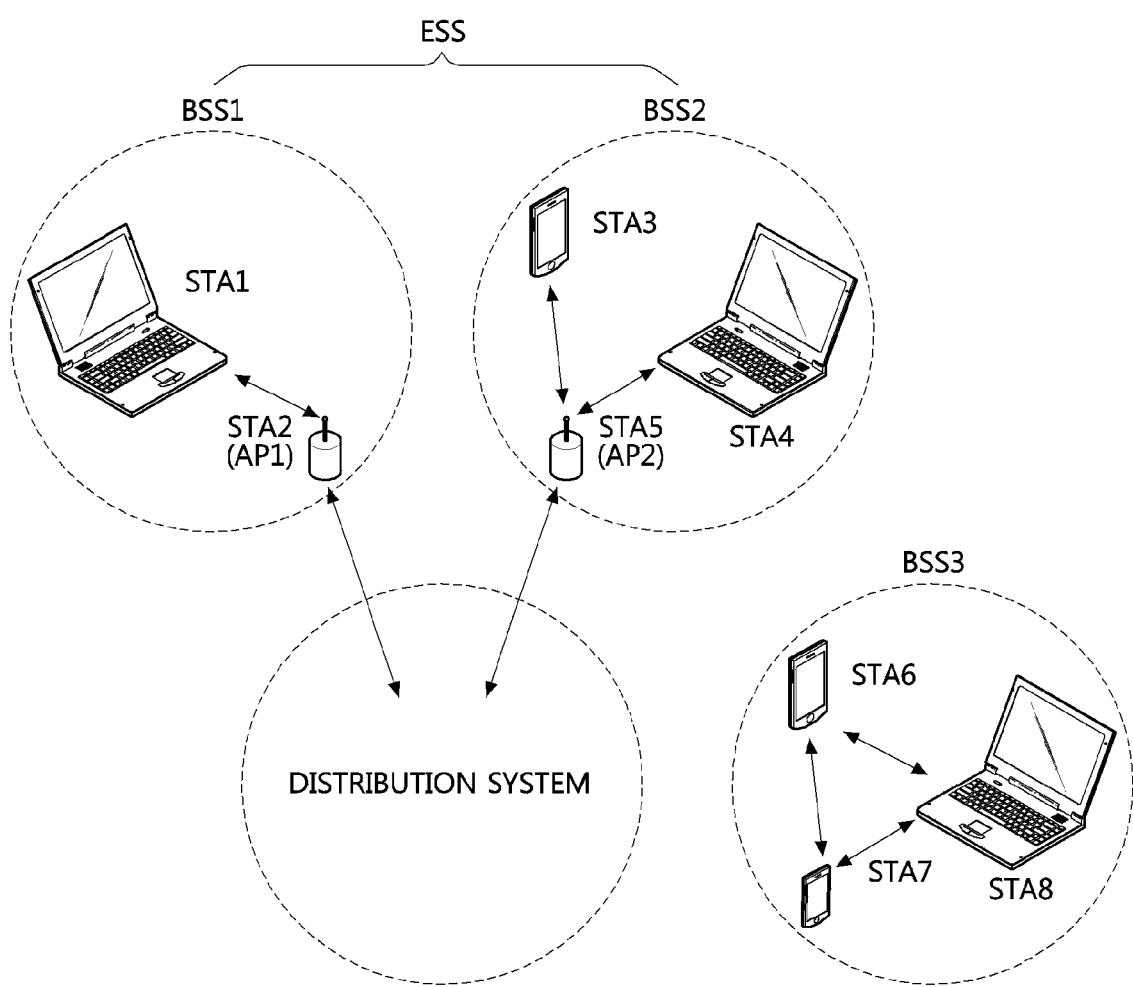
FIG. 2 is a conceptual diagram showing an example embodiment of the configuration of a wireless local area network (WLAN) system conforming to the Institute of Electrical and Electronics Engineers (IEEE) 802.11.

FIG. 2 is a conceptual diagram showing an example embodiment of the configuration of a WLAN system conforming to IEEE 802.11.

Referring to FIG. 2, a WLAN system conforming to IEEE 802.11 may include at least one basic service set (BSS). The BSS denotes a set of STAs including STA1, STA2 (AP1), STA3, STA4, STA5 (AP2), STA6, STA7, and STA8 that are successfully synchronized with each other to communicate with each other, and is not a concept denoting a specific area.

BSSs may be classified as infrastructure BSSs and independent BSSs (IBSSs). Here, BSS1 and BSS2 are infrastructure BSSs, and BSS3 is an IBSS.

BSS1 may include a first terminal STA1, a first AP STA2 (AP1) that provides a distribution service, and a distribution system DS that connects the plurality of APs STA2 (AP1) and STA5 (AP2). In BSS1, the first AP STA2 (AP1) may manage the first terminal STA1.

BSS2 may include a second terminal STA3, a third terminal STA4, a second AP STA5(AP2) that provides a distribution service, and the distribution system DS that connects the plurality of APs STA2 (AP1) and STA5 (AP2). In BSS2, the second AP STA5 (AP2) may manage the second terminal STA3 and the third terminal STA4.

BSS3 denotes an IBSS operating in an ad-hoc mode. In BSS3, there is not any AP that is a centralized management entity. In other words, in BSS3, the terminals STA6, STA7, and STA8 are managed in a distributed manner. In BSS3, all the terminals STA6, STA7, and STA8 may denote mobile terminals, and constitute a self-contained network because access to the distribution system DS is not allowed.

The APs STA2 (AP1) and STA5 (AP2) may provide access to the distribution system DS for the terminals STA1, STA3, and STA4 connected thereto through a wireless medium. In BSS1 and BSS2, communication between the terminals STA1, STA3, and STA4 is generally performed through the APs STA2 (AP1) and STA5 (AP2). However, when a direct link is established, direct communication between the terminals STA1, STA3, and STA4 is possible.

The plurality of infrastructure BSSs may be connected with each other through the distribution system DS. The plurality of BSSs connected through the distribution system DS is referred to as an extended service set (ESS). The entities STA1, STA 2(AP1), STA3, STA4, and STA5 (AP2) included in the ESS may communicate with each other. In the same ESS, arbitrary terminals STA1, STA3, and STA4 may move from one BSS to another BSS while seamlessly communicating.

The distribution system DS is a mechanism for one AP to communicate with another AP. According to the distribution system DS, an AP may transmit a frame for terminals associated to a BSS managed by the AP, or transmit a frame for an arbitrary terminal having moved to another BSS. Also, an AP may exchange frames with an external network, such as a wired network. This distribution system DS is not necessarily a network and may have any form as long as a predetermined distribution service defined in the IEEE 802.11 standards is provided. For example, the distribution system DS may be a wireless network, such as a mesh network, or a physical structure that connects APs with each other.

Figure 3:
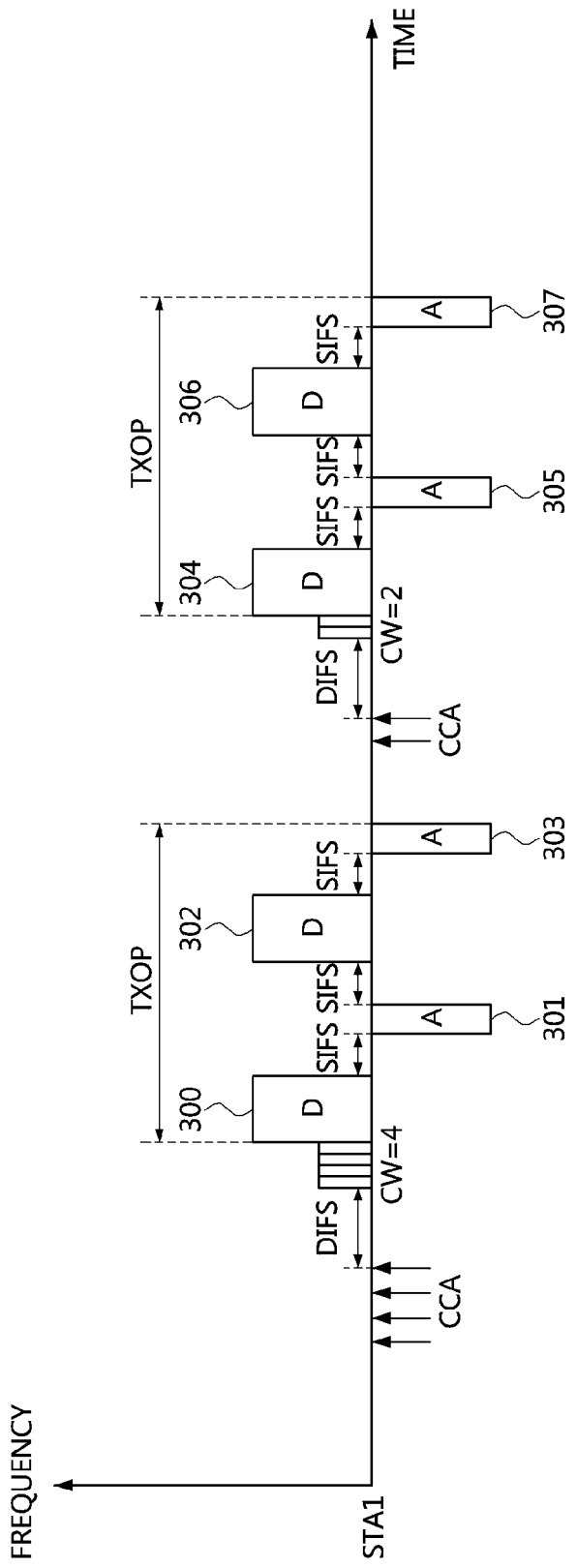
FIG. 3 is a conceptual diagram illustrating an example embodiment of a method of transmitting and receiving a frame in a WLAN.

FIG. 3 is a conceptual diagram illustrating an example embodiment of a method of transmitting and receiving a frame in a WLAN.

Referring to FIG. 3, a first STA STA1 that intends to transmit data may determine whether or not a channel has been occupied based on clear channel assessment (CCA) that is a standard WLAN sensing technique. When a result of CCA indicates that the channel is in an idle state, if the channel is in the idle state within a distributed coordination function (DCF) inter-frame space (DIFS) and a contention window (CW) (e.g., CW=4) according to a random backoff, the first STA STA1 may acquire a transmit opportunity (TXOP) for transmitting a data frame 300. Here, the random backoff denotes a procedure of additionally waiting for as much time as a product of a slot time (aSlotTime) and the CW.

The first STA STA1 may complete data transmission within the acquired TXOP. For example, the first STA STA1 may transmit the data frame 300 to a second STA. When the data frame 300 is received, the second STA may transmit an acknowledgement (ACK) frame 301 to the first STA STA1 a short inter frame space (SIFS) after a time point at which reception of the data frame 300 is finished. When the ACK frame 301 is received, the first STA STA1 may determine that the data frame 300 has been successfully received by the second STA. The first STA STA1 may transmit a data frame 302 to the second STA2 an SIFS after a time point at which reception of the ACK frame 301 is finished. When the data frame 302 is received, the second STA may transmit an ACK frame 303 to the first STA STA1 an SIFS after a time point at which reception of the data frame 302 is finished. When the ACK frame 303 is received, the first STA STA1 may determine that the data frame 302 has been successfully received by the second STA.

When there is data to be additionally transmitted, the first STA STA1 may acquire a TXOP again. The first STA STA1 may determine whether or not the channel has been occupied based on CCA. When a result of CCA indicates that the channel is in the idle state, if the channel is in the idle state within a DIFS and a CW (CW=2), the first STA STA1 may acquire a TXOP for transmitting a data frame 304. The first STA STA1 may transmit the data frame 304 to the second STA in the TXOP. When the data frame 304 is received, the second STA may transmit an ACK frame 305 to the first STA STA1 an SIFS after a time point at which reception of the data frame 304 is finished.

When the ACK frame 305 is received, the first STA STA1 may determine that the data frame 304 has been successfully received by the second STA. The first STA STA1 may transmit a data frame 306 to the second STA2 an SIFS after a time point at which reception of the ACK frame 305 is finished. When the data frame 306 is received, the second STA may transmit an ACK frame 307 to the first STA STA1 an SIFS after a time point at which reception of the data frame 306 is finished. When the ACK frame 307 is received, the first STA STA1 may determine that the data frame 306 has been successfully received by the second STA.

Every time the respective data frames 300, 302, 304, and 306 are transmitted, the respective ACK frames 301, 303, 305, and 307 are required to be transmitted, and thus the overhead of the WLAN may increase due to the continuous transmissions of the ACK frames 301, 303, 305, and 307. Also, MAC headers included in the respective data frames 300, 302, 304, and 306 are identical to each other, and thus the overhead of the WLAN may unnecessarily increase.

To solve these problems, an aggregate-MAC protocol data unit (A-MPDU) and an aggregate-MAC service data unit (A-MSDU) are defined in the IEEE 801.11n standard.

Figure 4:
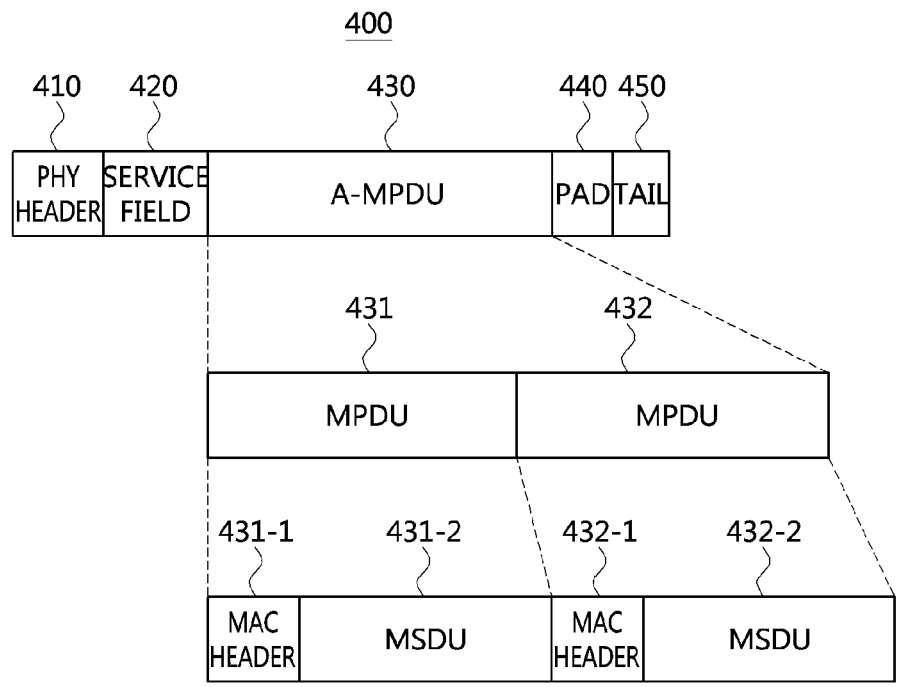
FIG. 4 is a block diagram of a physical layer convergence procedure (PLCP) protocol data unit (PPDU) including an aggregate-media access control (MAC) protocol data unit (A-MPDU)

FIG. 4 is a block diagram of a physical layer convergence procedure (PLCP) protocol data unit (PPDU) including an A-MPDU.

Referring to FIG. 4, a PPDU 400 may include a physical layer (PHY) header 410, a service field 420, and an A-MPDU 430. Also, the PPDU 400 may further include at least one of a pad bit 440 and a tail bit 450. The A-MPDU 430 may include at least one MPDU 431 and 432. The first MPDU 431 may include a MAC header 431-1 and an MSDU 431-2. The second MPDU 432 may include a MAC header 432-1 and an MSDU 432-2. Using the PPDU 400 including the A-MPDU 430, it is possible to minimize continuous transmissions of ACK frames.

Figure 5:
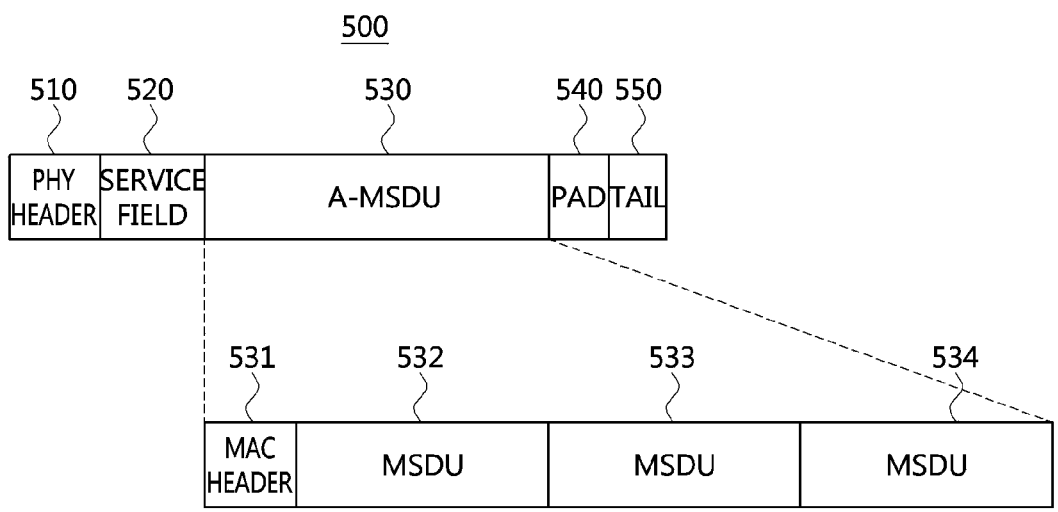
FIG. 5 is a block diagram of a PPDU including an aggregate-MAC service data unit (A-MSDU)

FIG. 5 is a block diagram of a PPDU including an A-MSDU.

Referring to FIG. 5, a PPDU 500 may include a PHY header 510, a service field 520, and an A-MSDU 530. Also, the PPDU 500 may further include at least one of a pad bit 540 and a tail bit 550. The A-MSDU 530 may include a MAC header 531 and at least one MSDU 532, 533, and 534. Using the PPDU 500 including the A-MSDU 530, it is possible to minimize continuous transmissions of ACK frames and MAC headers.

Figure 6:
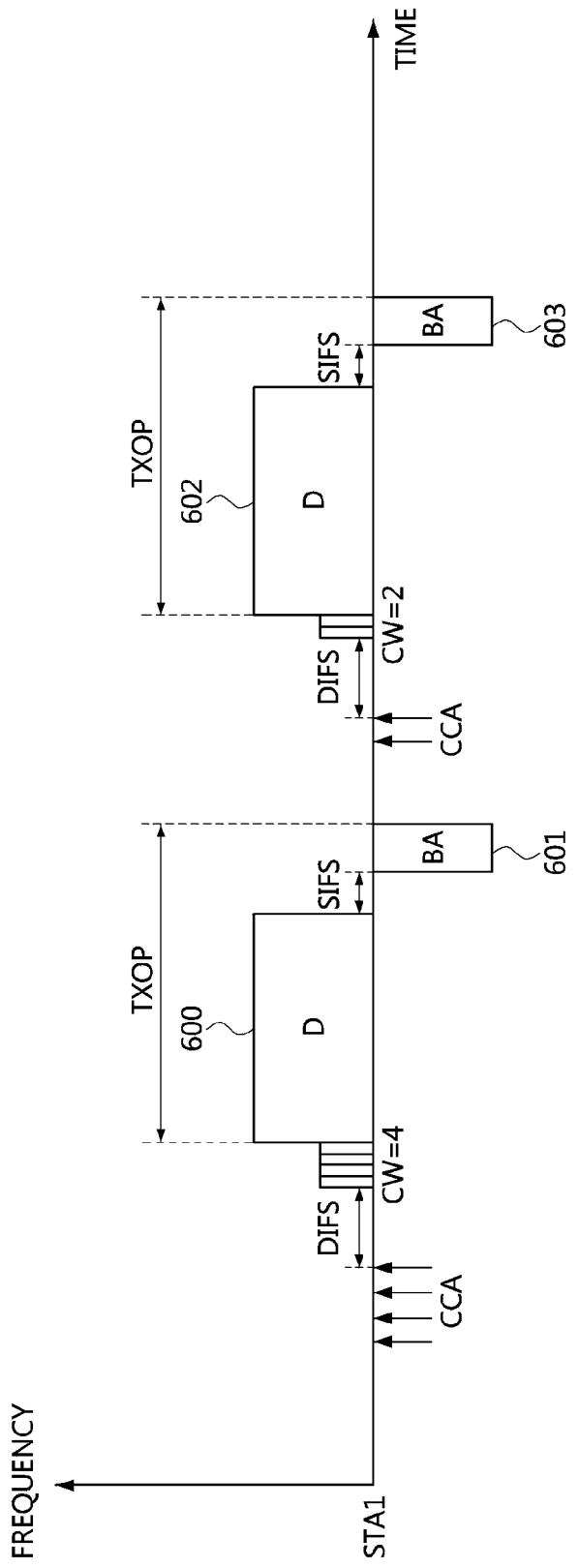
FIG. 6 is a conceptual diagram illustrating another example embodiment of a method of transmitting and receiving a frame in a WLAN.

FIG. 6 is a conceptual diagram illustrating another example embodiment of a method of transmitting and receiving a frame in a WLAN.

Referring to FIG. 6, a first STA STA1 that intends to transmit data may determine whether or not a channel has been occupied based on CCA. When a result of CCA indicates that the channel is in the idle state, if the channel is in the idle state within a DIFS and a CW (CW=4), the first STA STA1 may acquire a TXOP for transmitting an A-MPDU 600 including at least one MPDU. In other words, the first STA STA1 may transmit the A-MPDU 600 to a second STA in the TXOP. When the A-MPDU 600 is received, the second STA may transmit a block ACK (BA) frame 601 to the first STA STA1 an SIFS after a time point at which reception of the A-MPDU 600 is finished. When the BA frame 601 is received, the first STA STA1 may determine that the A-MPDU 600 has been successfully received by the second STA.

When there is data to be additionally transmitted, the first STA STA1 may acquire a TXOP again. In other words, the first STA STA1 may determine whether or not the channel has been occupied based on CCA. When a result of CCA indicates that the channel is in the idle state, if the channel is in the idle state within a DIFS and a CW (CW=2), the first STA STA1 may acquire a TXOP for transmitting an A-MSDU 602 including at least one MSDU. In other words, the first STA STA1 may transmit the A-MSDU 602 to the second STA in the TXOP. When the A-MSDU 602 is received, the second STA may transmit a BA frame 603 to the first STA STA1 an SIFS after a time point at which reception of the A-MSDU 602 is finished. When the BA frame 603 is received, the first STA STA1 may determine that the A-MSDU 602 has been successfully received by the second STA.

Using an A-MPDU or an A-MSDU, it is possible to minimize continuous transmissions of ACK frames and MAC headers. However, since an A-MPDU or an A-MSDU is transmitted to only one STA, the use of an A-MPDU or an A-MSDU may be inefficient when many STAs are in one BSS. When data to be transmitted to a specific STA is very large, transmission of the data may not be completed in a current TXOP. In this case, the data to be transmitted to the specific STA may be continuously transmitted in a subsequent TXOP after performing of CCA and a time corresponding to "a DIFS+a CW." Likewise, data to be transmitted to another STA in the same BSS may also be transmitted in the subsequent TXOP after performing of CCA and the time corresponding to "the DIFS+the CW." In other words, when data to be transmitted is large or many STAs are in one BSS, temporal overhead may occur due to the time required for channel access (e.g., a DIFS and a CW). Therefore, the performance of a WLAN may be degraded.

Further, the number of STAs associated to each BSS is drastically increasing in a downtown area, and thus collisions between STAs in a BSS and collisions between STAs associated to neighboring BSSs are increasing. In this situation, a transmission method for efficiently transmitting data to many STAs associated to one BSS is necessary.

Figure 7:
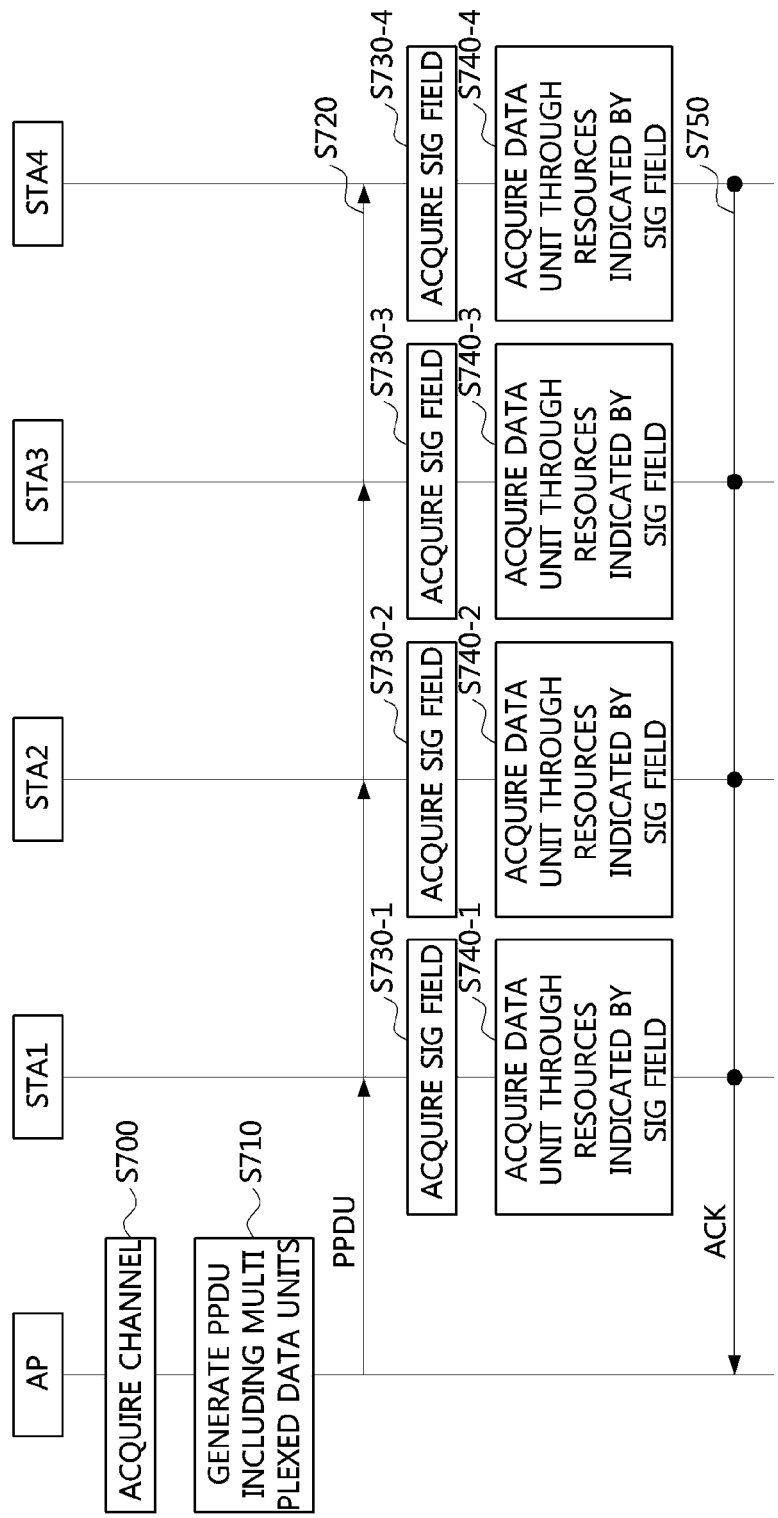
FIG. 7 is a sequence diagram illustrating a method of transmitting and receiving a frame according to an example embodiment of present invention.
Figure 8:
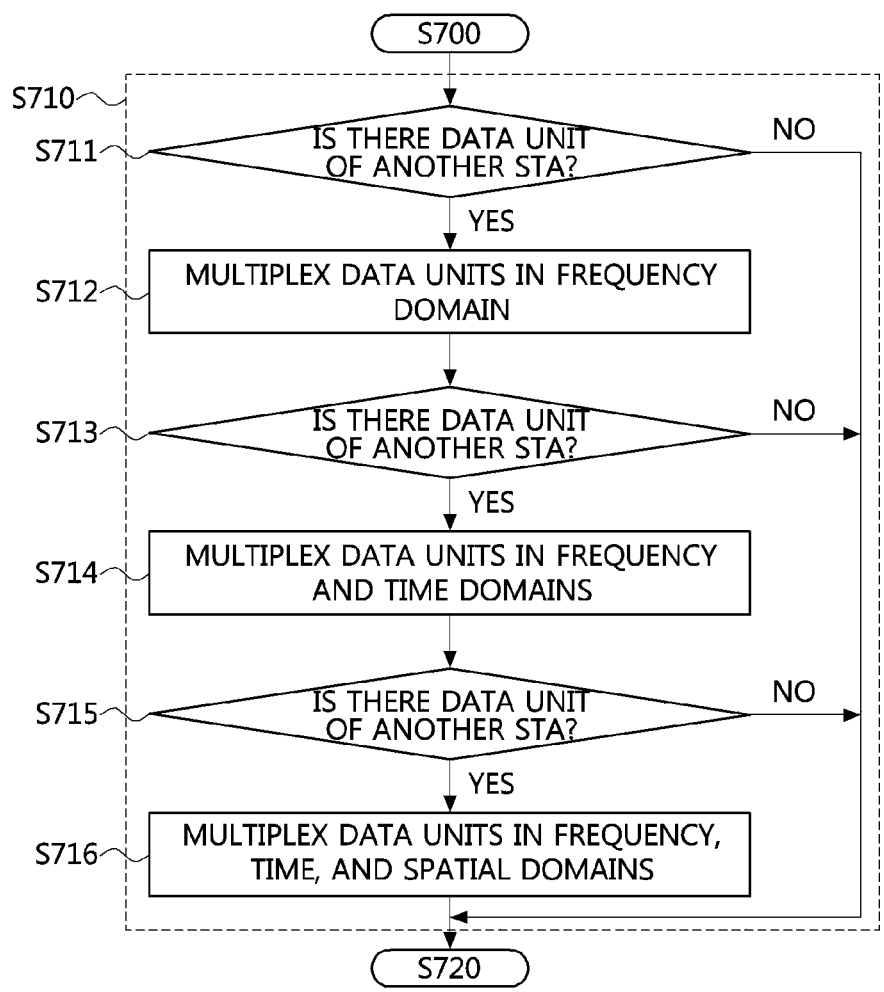
FIG. 8 is a flowchart illustrating an operation of generating a PPDU in a method of transmitting and receiving a frame according to an example embodiment of present invention.

FIG. 7 is a sequence diagram illustrating a method of transmitting and receiving a frame according to an example embodiment of present invention, and FIG. 8 is a flowchart illustrating an operation of generating a PPDU in a method of transmitting and receiving a frame according to an example embodiment of present invention.

Referring to FIGS. 7 and 8, an AP may form a BSS. Respective terminals STA1 to STA4 may belong to the BSS and may be associated to the AP. The AP that intends to transmit a first data unit DU1 to the first terminal STA1 may determine whether or not a channel has been occupied based on CCA. When a result of CCA indicates that the channel is in the idle state, if the channel is in the idle state within a DIFS and a CW, the AP may acquire a TXOP for transmitting the first data unit DU1 (S700). Here, the data unit may denote an MPDU or an MSDU.

After acquiring a TXOP, the AP may generate a PPDU including multiplexed data units (S710). Specifically, the AP may determine whether or not a data unit to be transmitted to the terminals STA2 to STA4 other than the first terminal STA1 among the terminals STA1 to STA4 associated thereto is in a transmission queue (S711). When any data unit to be transmitted to the other terminals STA2 to STA4 is not in the transmission queue, 5720 may be performed as the subsequent operation.

On the other hand, when a data unit to be transmitted to the other terminals STA2 to STA4 is in the transmission queue, the AP may multiplex the data units in the frequency domain and generate a PPDU including the multiplexed data units (S712). The PPDU including the data units multiplexed in the frequency domain is as follows.

Figure 9:
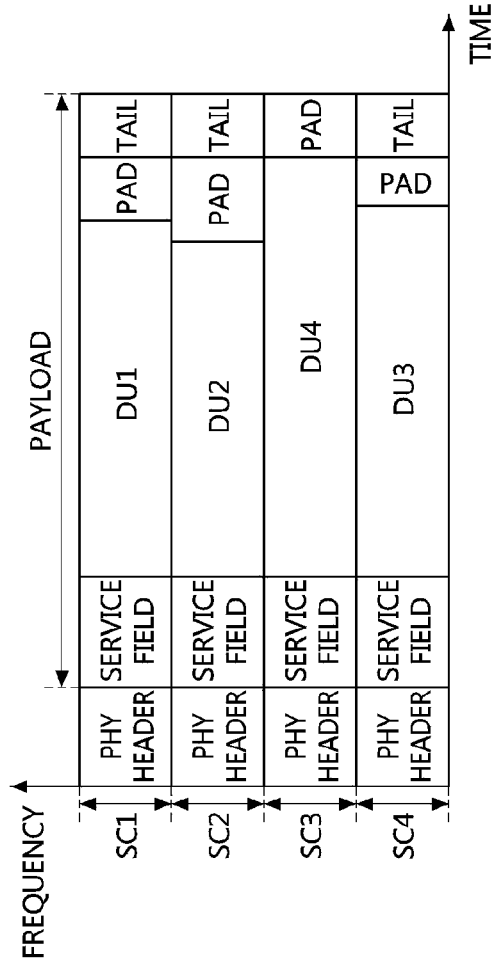
FIG. 9 is a block diagram of an example embodiment of a PPDU including data units multiplexed in the frequency domain.

FIG. 9 is a block diagram of an example embodiment of a PPDU including data units multiplexed in the frequency domain.

Referring to FIG. 9, the PPDU may include PHY headers and payloads. The AP may assign a first data unit DU1 to be transmitted to the first terminal STA1 to a first subcarrier SC1 in a whole band, a second data unit DU2 to be transmitted to the second terminal STA2 to a second subcarrier SC2 in the whole band, a third data unit DU3 to be transmitted to the third terminal STA3 to a fourth subcarrier SC4 in the whole band, and a fourth data unit DU4 to be transmitted to the fourth terminal STA4 to a third subcarrier SC3 in the whole band.

Here, to equalize the payload sizes of the respective subcarriers SC1 to SC4, the AP may add at least one of a pad bit (e.g., an MAC pad bit or a PHY pad bit) and a tail bit to each of the data units DU1 to DU4.

Referring back to FIGS. 7 and 8, after multiplexing the data units in the frequency domain, the AP may determine whether or not a data unit to be transmitted to the terminals STA2 to STA4 other than the first terminal STA1 among the terminals STA1 to STA4 associated thereto is in the transmission queue (S713). When any data unit to be transmitted to the other terminals STA2 to STA4 is not in the transmission queue, S720 may be performed as the subsequent operation. In other words, the AP may transmit the PPDU including the data units multiplexed in the frequency domain.

On the other hand, when a data unit to be transmitted to the other terminals STA2 to STA4 is in the transmission queue even if the data units are multiplexed in the frequency domain, the AP may multiplex the data units in the frequency and time domains and generate a PPDU including the multiplexed data units (S714). The PPDU including the data units multiplexed in the frequency and time domains is as follows.

Figure 10:
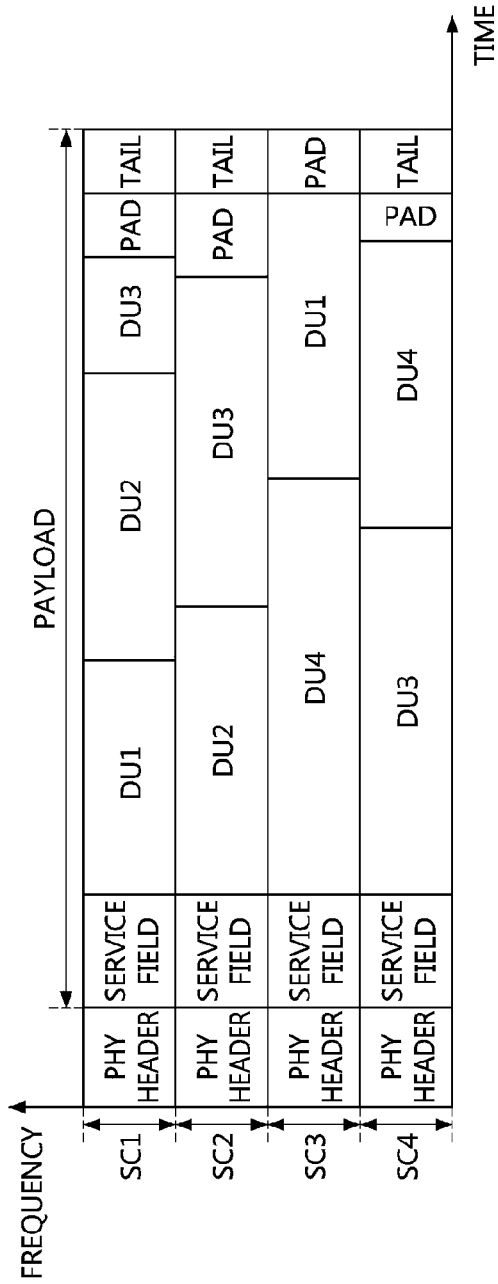
FIG. 10 is a block diagram of an example embodiment of a PPDU including data units multiplexed in the frequency and time domains.

FIG. 10 is a block diagram of an example embodiment of a PPDU including data units multiplexed in the frequency and time domains.

Referring to FIG. 10, the PPDU may include PHY headers and payloads. The AP may assign the first data unit DU1 to be transmitted to the first terminal STA1, the second data unit DU2 to be transmitted to the second terminal STA2, and the third data unit DU3 to be transmitted to the third terminal STA3 to the first subcarrier SC1 in the whole band. The AP may assign the second data unit DU2 to be transmitted to the second terminal STA2 and the third data unit DU3 to be transmitted to the third terminal STA3 to the second subcarrier SC2 in the whole band. The AP may assign the fourth data unit DU4 to be transmitted to the fourth terminal STA4 and the first data unit DU1 to be transmitted to the first terminal STA1 to the third subcarrier SC3 in the whole band. The AP may assign the third data unit DU3 to be transmitted to the third terminal STA3 and the fourth data unit DU4 to be transmitted to the fourth terminal STA4 to the fourth subcarrier SC4 in the whole band.

Here, to equalize the payload sizes of the respective subcarriers SC1 to SC4, the AP may add at least one of a pad bit (e.g., an MAC pad bit or a PHY pad bit) and a tail bit to last data units DU1, DU3, and DU4 included in the payloads.

Meanwhile, a PPDU including MPDUs multiplexed in the time domain and a PPDU including MSDUs multiplexed in the time domain are as follows.

FIG. 11 is a block diagram of an example embodiment of a PPDU including MPDUs multiplexed in the time domain.

Referring to FIG. 11, a PPDU 1100 may include a PHY header 1101, a service field 1102, an MPDU-1 1103, an MPDU-2 1104, and an MPDU-3 1105. Also, the PPDU 1100 may further include at least one of a pad bit 1106 and a tail bit 1107. Each of MPDUs 1103, 1104, 1105 included in the PPDU 1100 may denote a data unit of different user. For example, the MPDU-1 1103 may denote a data unit to be transmitted to the first terminal STA1, the MPDU-2 1104 may denote a data unit to be transmitted to the second terminal STA2, and the MPDU-3 1105 may denote a data unit to be transmitted to the third terminal STA3.

FIG. 12 is a block diagram of an example embodiment of a PPDU including MDSUs multiplexed in the time domain.

Referring to FIG. 12, a PPDU 1200 may include a PHY header 1201, a service field 1202, a MAC header 1203, an MSDU-1 1204, an MSDU-2 1205, and an MSDU-3 1206. Also, the PPDU 1200 may further include at least one of a pad bit 1207 and a tail bit 1208. Each of MSDUs 1204, 1205, 1206 included in the PPDU 1200 may denote a data unit of different user. For example, the MSDU-1 1204 may denote a data unit to be transmitted to the first terminal STA1, the MSDU-2 1205 may denote a data unit to be transmitted to the second terminal STA2, and the MSDU-3 1206 may denote a data unit to be transmitted to the third terminal STA3.

Referring back to FIGS. 7 and 8, after multiplexing the data units in the frequency and time domains, the AP may determine whether or not a data unit to be transmitted to the terminals STA2 to STA4 other than the first terminal STA1 among the terminals STA1 to STA4 associated thereto is in the transmission queue (S715). When any data unit to be transmitted to the other terminals STA2 to STA4 is not in the transmission queue, S720 may be performed as the subsequent operation. In other words, the AP may transmit the PPDU including the data units multiplexed in the frequency and time domains.

On the other hand, when a data unit to be transmitted to the other terminals STA2 to STA4 is in the transmission queue even if the data units are multiplexed in the frequency and time domains, the AP may multiplex the data units in the frequency, time, and spatial domains and generate a PPDU including the multiplexed data units (S716). The PPDU including the data units multiplexed in the frequency, time, and spatial domains is as follows.

Figure 13:
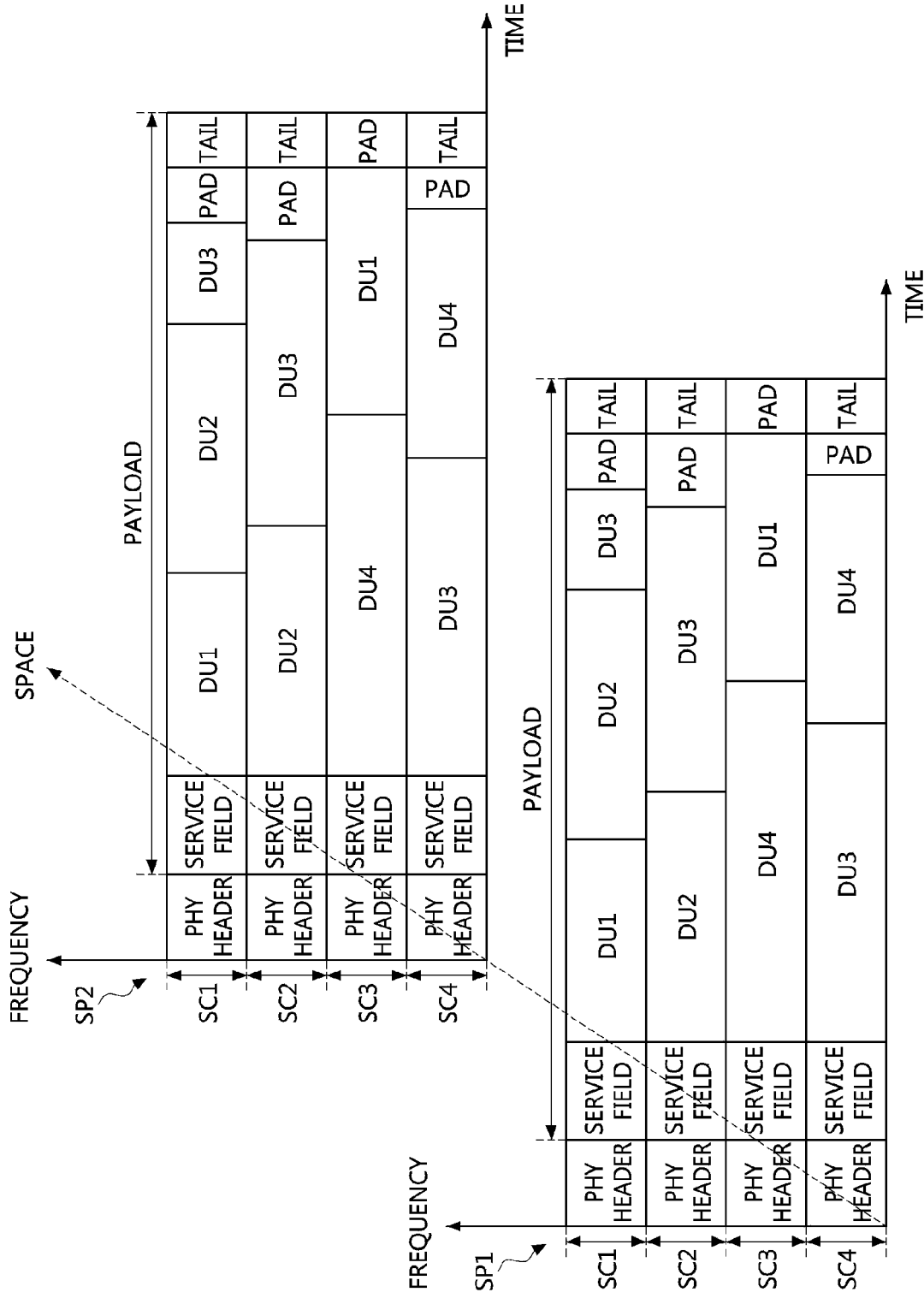
FIG. 13 is a block diagram of an example embodiment of a PPDU including data units multiplexed in the frequency, time, and spatial domains.

FIG. 13 is a block diagram of an example embodiment of a PPDU including data units multiplexed in the frequency, time, and spatial domains.

Referring to FIG. 13, a PPDU may include PHY headers and payloads. A first space SP1 and a second space SP2 may be orthogonal to each other. The AP may assign data units to the first space SP1. In other words, the AP may assign the first data unit DU1 to be transmitted to the first terminal STA1, the second data unit DU2 to be transmitted to the second terminal STA2, and the third data unit DU3 to be transmitted to the third terminal STA3 to the first subcarrier SC1 in the whole band. The AP may assign the second data unit DU2 to be transmitted to the second terminal STA2 and the third data unit DU3 to be transmitted to the third terminal STA3 to the second subcarrier SC2 in the whole band. The AP may assign the fourth data unit DU4 to be transmitted to the fourth terminal STA4 and the first data unit DU1 to be transmitted to the first terminal STA1 to the third subcarrier SC3 in the whole band. The AP may assign the third data unit DU3 to be transmitted to the third terminal STA3 and the fourth data unit DU4 to be transmitted to the fourth terminal STA4 to the fourth subcarrier SC4 in the whole band.

Also, the AP may assign data units to the second space SP2. The AP may assign the first data unit DU1 to be transmitted to the first terminal STA1, the second data unit DU2 to be transmitted to the second terminal STA2, and the third data unit DU3 to be transmitted to the third terminal STA3 to the first subcarrier SC1 in the whole band. The AP may assign the second data unit DU2 to be transmitted to the second terminal STA2 and the third data unit DU3 to be transmitted to the third terminal STA3 to the second subcarrier SC2 in the whole band. The AP may assign the fourth data unit DU4 to be transmitted to the fourth terminal STA4 and the first data unit DU1 to be transmitted to the first terminal STA1 to the third subcarrier SC3 in the whole band. The AP may assign the third data unit DU3 to be transmitted to the third terminal STA3 and the fourth data unit DU4 to be transmitted to the fourth terminal STA4 to the fourth subcarrier SC4 in the whole band.

Here, to equalize the payload sizes of the respective subcarriers SC1 to SC4, the AP may add at least one of a pad bit (e.g., an MAC pad bit or a PHY pad bit) and a tail bit to last data units DU1, DU3, and DU4 included in the payloads.

Meanwhile, the AP may generate a PPDU including data units multiplexed in the spatial domain for two major purposes. First, to acquire a spatial diversity gain, the AP may transmit a PPDU including the data units DU1 to DU4 multiplexed in the frequency and time domains repeatedly in the spatial domain. Second, to increase the transmission capacity, the AP may generate different PPDUs including the data units DU1 to DU4 multiplexed in the frequency and time domains and transmit the different PPDUs in separate spaces.

Referring back to FIGS. 7 and 8, it has been described above that frequency multiplexing, frequency-time multiplexing, and frequency-time-spatial multiplexing are sequentially performed according to the state of the transmission queue (e.g., the state of the transmission queue after multiplexing) in operation S710. In addition to this, in another example embodiment of the present invention, the AP may generate a PPDU based on at least one of frequency multiplexing, time multiplexing, and spatial multiplexing according to the state of the transmission queue. In other words, the AP may generate a PPDU including data units multiplexed based on the size of data currently stored in the transmission queue without considering the state of the transmission queue after multiplexing. For example, when many data units are currently stored in the transmission queue, the AP may generate a PPDU including data units multiplexed in the frequency, time, and spatial domains. On the other hand, when few data units are cunently stored in the transmission queue, the AP may generate a PPDU including data units multiplexed in the frequency, time, or spatial domain.

Meanwhile, a signal (SIG) field of the PPDU may include at least one of the lengths of the data units, the receiver identifiers (IDs) of the data units (e.g., association IDs (AIDs), partial AIDs (PAIDs), and group IDs), channels in which the data units are transmitted, transmission sections, and transmission spaces. Here, the SIG field may denote a high throughput (HT)-SIG A field or an HT-SIG B field defined in the IEEE 802.11n standard. Alternatively, the SIG field may denote a very high throughput (VHT)-SIG A field or a VHT-SIG B field defined in the IEEE 802.11ac standard. For example, the receiver IDs of the data units may be set in a group ID field included in the VHT-SIG A field. The spaces in which the data units are transmitted may be set in a number of spatial-time stream (NSTS) field included in the VHT-SIG A field.

The AP may generate the PPDU and then transmit the PPDU to the terminals STA1 to STA4 (S720). When the PPDU is received, the respective terminals STA1 to STA4 may acquire the SIG field included in the PPDU (S730-1, S730-2, S730-3, and S730-4). Based on information included in the SIG field, each of the respective terminals STA1 to STA4 may determine whether or not a data unit for the terminal is in the PPDU. When a data unit for the terminal is in the PPDU, the terminal may determine resources (i.e., frequency resources, time resources, or space resources) through which the data unit for the terminal is transmitted based on the information included in the SIG field. The respective terminals STA1 to STA4 may acquire data units through resources indicated by the SIG field (S740-1, S740-2, S740-3, and S740-4). When the corresponding data unit is successfully received, each of the terminals STA1 to STA4 may transmit an ACK frame to the AP an SIFS after a time point at which the PPDU is received (S750).

At this time, each of the terminals STA1 to STA4 may transmit a BA frame to the AP as a response to the reception of the corresponding data unit. Here, each of the terminals STA1 to STA4 may transmit the corresponding ACK frame to the AP through resources corresponding to resources through which a data unit for the terminal has been transmitted. For example, when a data unit is received through a second transmission section in a first subcarrier of a PPDU received from a fourth antenna, each of the terminals STA1 to STA4 may set an ACK frame which is a response to the data unit in a second transmission section in a first subcarrier of a PPDU to be transmitted through the fourth antenna.

Figure 14:
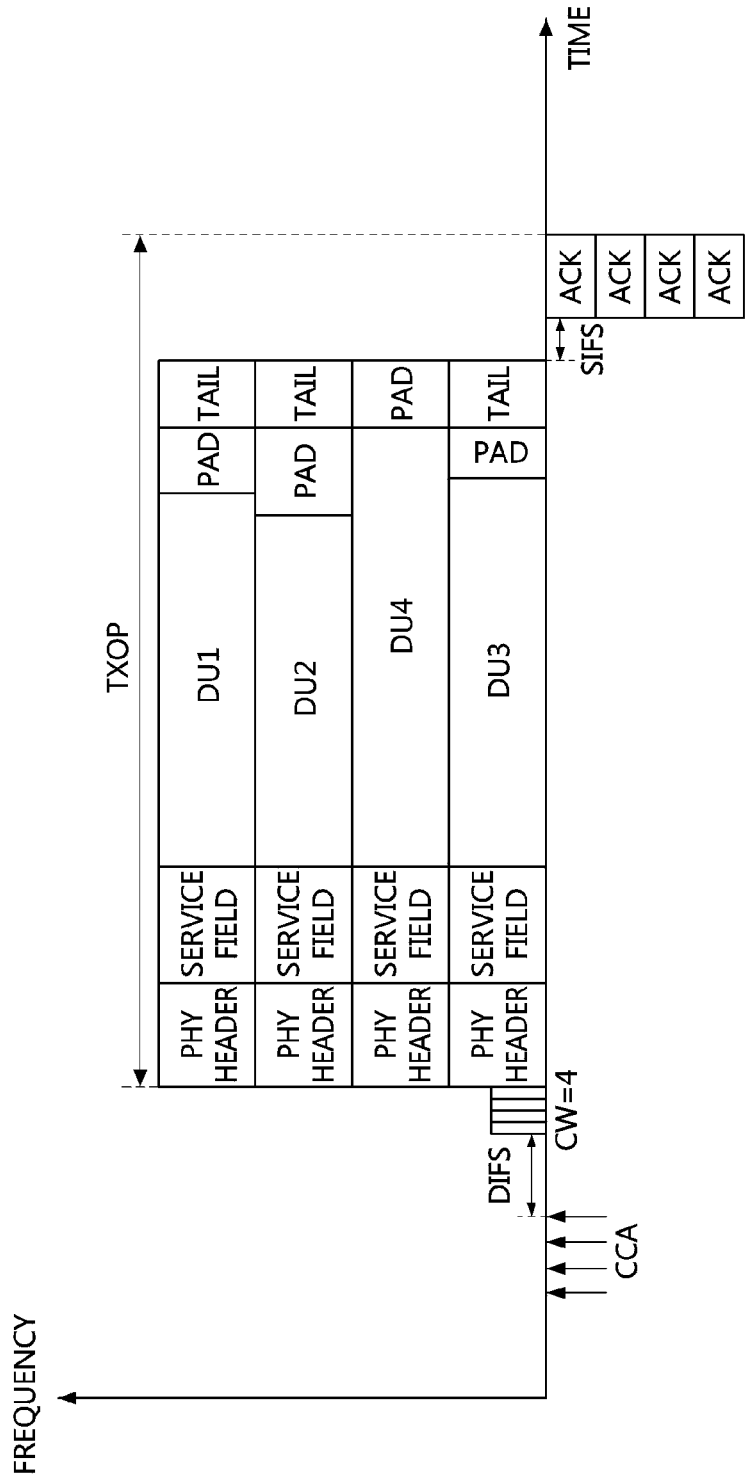
FIG. 14 is a conceptual diagram of an example embodiment of a method of transmitting and receiving a PPDU including data units multiplexed in the frequency domain.

FIG. 14 is a conceptual diagram of an example embodiment of a method of transmitting and receiving a PPDU including data units multiplexed in the frequency domain.

Referring to FIG. 14, an AP that intends to transmit a first data unit DU1 for a first terminal STA1 may determine whether or not a channel has been occupied based on CCA. When a result of CCA indicates that the channel is in the idle state, if the channel is in the idle state within a DIFS and a CW (CW=4), the AP may acquire a TXOP. The AP may determine whether or not a data unit to be transmitted to terminals STA2 to STA4 other than the first terminal STA1 among the terminals STA1 to STA4 associated thereto is in a transmission queue.

When a data unit to be transmitted to the other terminals STA2 to STA4 is in the transmission queue, the AP may multiplex data units DU1 to DU4 for the respective terminals STA1 to STA4 in the frequency domain. For example, the first data unit DU1 for the first terminal STA1 may be assigned to a first subcarrier SC1, the second data unit DU2 for the second terminal STA2 may be assigned to a second subcarrier SC2, the fourth data unit DU4 for the fourth terminal STA4 may be assigned to a third subcarrier SC3, and the third data unit DU3 for the third terminal STA3 may be assigned to a fourth subcarrier SC4.

The AP may transmit a PPDU including the data units DU1 to DU4 multiplexed in the frequency domain to the terminals STA1 to STA4. The respective terminals STA1 to STA4 may receive the PPDU, and determine whether or not the data units DU1 to DU4 thereof are in the PPDU based on information included in the SIG field of the PPDU. When the data units DU1 to DU4 thereof are in the PPDU, the respective terminals STA1 to STA4 may determine resources through which the data units DU1 to DU4 thereof are transmitted based on the information included in the SIG field of the PPDU.

The respective terminals STA1 to STA4 may receive the data units DU1 to DU4 thereof through the resources indicated by the SIG field of the PPDU. When the data units DU1 to DU4 are successfully received, the respective terminals STA1 to STA4 may transmit ACK frames to the AP an SIFS after a time point at which reception of the PPDU is finished. At this time, the respective terminals STA1 to STA4 may transmit the ACK frames to the AP through resources corresponding to the resources through which the data units DU1 to DU4 thereof have been transmitted.

Figure 15:
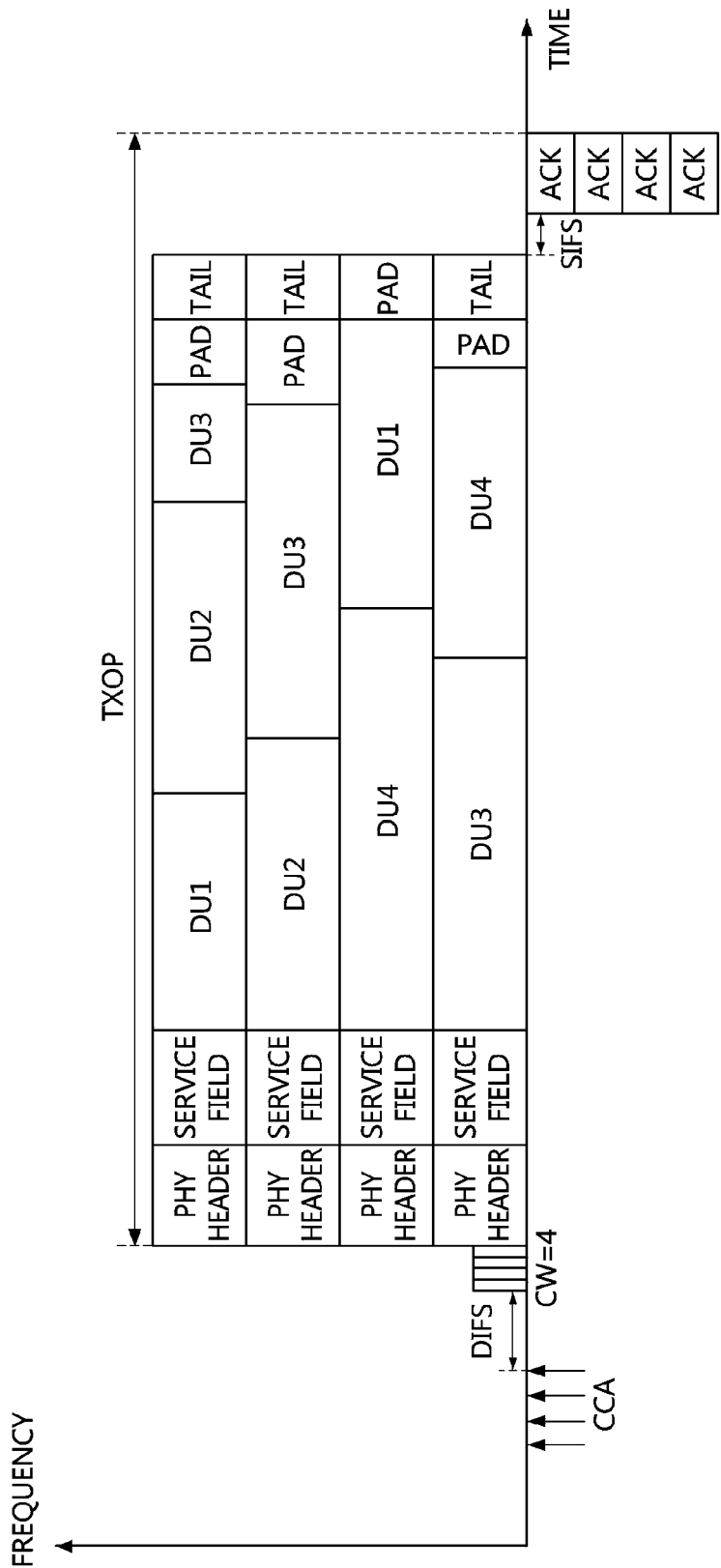
FIG. 15 is a conceptual diagram of an example embodiment of a method of transmitting and receiving a PPDU including data units multiplexed in the frequency and time domains.

FIG. 15 is a conceptual diagram of an example embodiment of a method of transmitting and receiving a PPDU including data units multiplexed in the frequency and time domains.

Referring to FIG. 15, an AP that intends to transmit a first data unit DU1 for a first terminal STA1 may determine whether or not a channel has been occupied based on CCA. When a result of CCA indicates that the channel is in the idle state, if the channel is in the idle state within a DIFS and a CW (CW=4), the AP may acquire a TXOP. The AP may determine whether or not a data unit to be transmitted to terminals STA2 to STA4 other than the first terminal STA1 among the terminals STA1 to STA4 associated thereto is in a transmission queue.

When a data unit to be transmitted to the other terminals STA2 to STA4 is in the transmission queue, the AP may multiplex data units DU1 to DU4 for the respective terminals STA1 to STA4 in the frequency and time domains. For example, the first data unit DU1 for the first terminal STA1, the second data unit DU2 for the second terminal STA2, and the third data unit DU3 for the third terminal STA3 may be assigned to a first subcarrier SC1. The second data unit DU2 for the second terminal STA2 and the third data unit DU3 for the third terminal STA3 may be assigned to a second subcarrier SC2. The fourth data unit DU4 for the fourth terminal STA4 and the first data unit DU1 for the first terminal STA1 may be assigned to a third subcarrier SC3. The third data unit DU3 for the third terminal STA3 and the fourth data unit DU4 for the fourth terminal STA4 may be assigned to a fourth subcarrier SC4.

The AP may transmit a PPDU including the data units DU1 to DU4 multiplexed in the frequency and time domains to the terminals STA1 to STA4. The respective terminals STA1 to STA4 may receive the PPDU, and determine whether or not the data units DU1 to DU4 thereof are in the PPDU based on information included in the SIG field of the PPDU. When the data units DU1 to DU4 thereof are in the PPDU, the respective terminals STA1 to STA4 may determine resources through which the data units DU1 to DU4 thereof are transmitted based on the information included in the SIG field of the PPDU.

The respective terminals STA1 to STA4 may receive the data units DU1 to DU4 thereof through the resources indicated by the SIG field of the PPDU. When the data units DU1 to DU4 are successfully received, the respective terminals STA1 to STA4 may transmit ACK frames to the AP an SIFS after a time point at which reception of the PPDU is finished. At this time, the respective terminals STA1 to STA4 may transmit the ACK frames to the AP through resources corresponding to the resources through which the data units DU1 to DU4 thereof have been transmitted.

Figure 16:
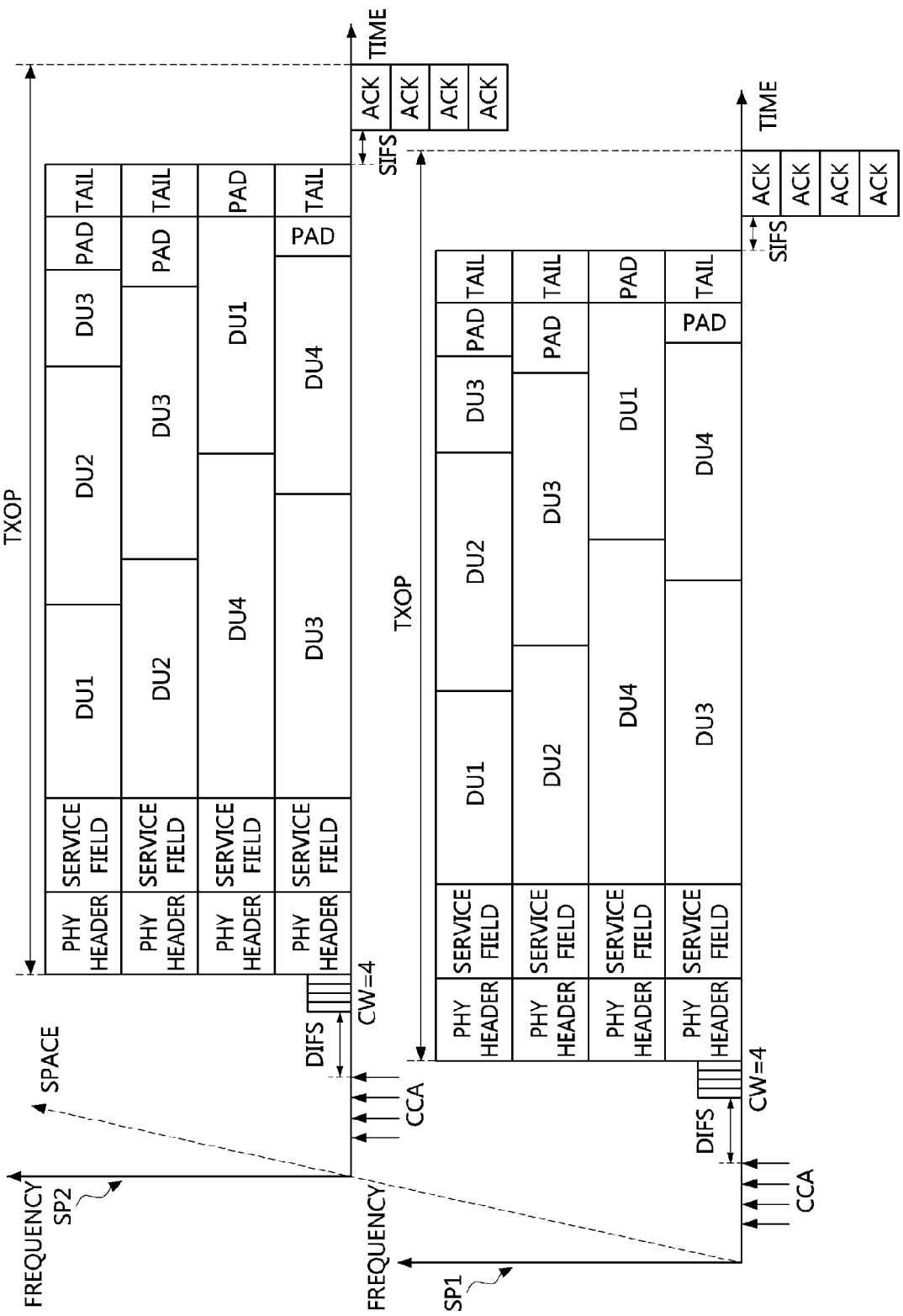
FIG. 16 is a conceptual diagram of an example embodiment of a method of transmitting and receiving a PPDU including data units multiplexed in the frequency, time, and spatial domains.

FIG. 16 is a conceptual diagram of an example embodiment of a method of transmitting and receiving a PPDU including data units multiplexed in the frequency, time, and spatial domains.

Referring to FIG. 16, an AP that intends to transmit a first data unit DU1 for a first terminal STA1 may determine whether or not a channel has been occupied based on CCA. When a result of CCA indicates that the channel is in the idle state, if the channel is in the idle state within a DIFS and a CW (CW=4), the AP may acquire a TXOP. The AP may determine whether or not a data unit to be transmitted to terminals STA2 to STA4 other than the first terminal STA1 among the terminals STA1 to STA4 associated thereto is in a transmission queue.

When a data unit to be transmitted to the other terminals STA2 to STA4 is in the transmission queue, the AP may multiplex data units DU1 to DU4 for the respective terminals STA1 to STA4 in the frequency, time, and spatial domains. For example, the first data unit DU1 for the first terminal STA1, the second data unit DU2 for the second terminal STA2, and the third data unit DU3 for the third terminal STA3 may be assigned to a first subcarrier SC1 in a first space SP1. The second data unit DU2 for the second terminal STA2 and the third data unit DU3 for the third terminal STA3 may be assigned to a second subcarrier SC2 in the first space SP1. The fourth data unit DU4 for the fourth terminal STA4 and the first data unit DU1 for the first terminal STA1 may be assigned to a third subcarrier SC3 in the first space SP1. The third data unit DU3 for the third terminal STA3 and the fourth data unit DU4 for the fourth terminal STA4 may be assigned to a fourth subcarrier SC4 in the first space SP1.

Also, the first data unit DU1 for the first terminal STA1, the second data unit DU2 for the second terminal STA2, and the third data unit DU3 for the third terminal STA3 may be assigned to a first subcarrier SC1 in a second space SP2. The second data unit DU2 for the second terminal STA2 and the third data unit DU3 for the third terminal STA3 may be assigned to a second subcarrier SC2 in the second space SP2. The fourth data unit DU4 for the fourth terminal STA4 and the first data unit DU1 for the first terminal STA1 may be assigned to a third subcarrier SC3 in the second space SP2. The third data unit DU3 for the third terminal STA3 and the fourth data unit DU4 for the fourth terminal STA4 may be assigned to a fourth subcarrier SC4 in the second space SP2.

The AP may transmit a PPDU including the data units DU1 to DU4 multiplexed in the frequency, time, and spatial domains to the terminals STA1 to STA4. The respective terminals STA1 to STA4 may receive the PPDU, and determine whether or not the data units DU1 to DU4 thereof are in the PPDU based on information included in the SIG field of the PPDU. When the data units DU1 to DU4 thereof are in the PPDU, the respective terminals STA1 to STA4 may determine resources through which the data units DU1 to DU4 thereof are transmitted based on the information included in the SIG field of the PPDU.

The respective terminals STA1 to STA4 may receive the data units DU1 to DU4 thereof through the resources indicated by the SIG field of the PPDU. When the data units DU1 to DU4 are successfully received, the respective terminals STA1 to STA4 may transmit ACK frames to the AP an SIFS after a time point at which reception of the PPDU is finished. At this time, the respective terminals STA1 to STA4 may transmit the ACK frames to the AP through resources corresponding to the resources through which the data units DU1 to DU4 thereof have been transmitted.

Figure 17:
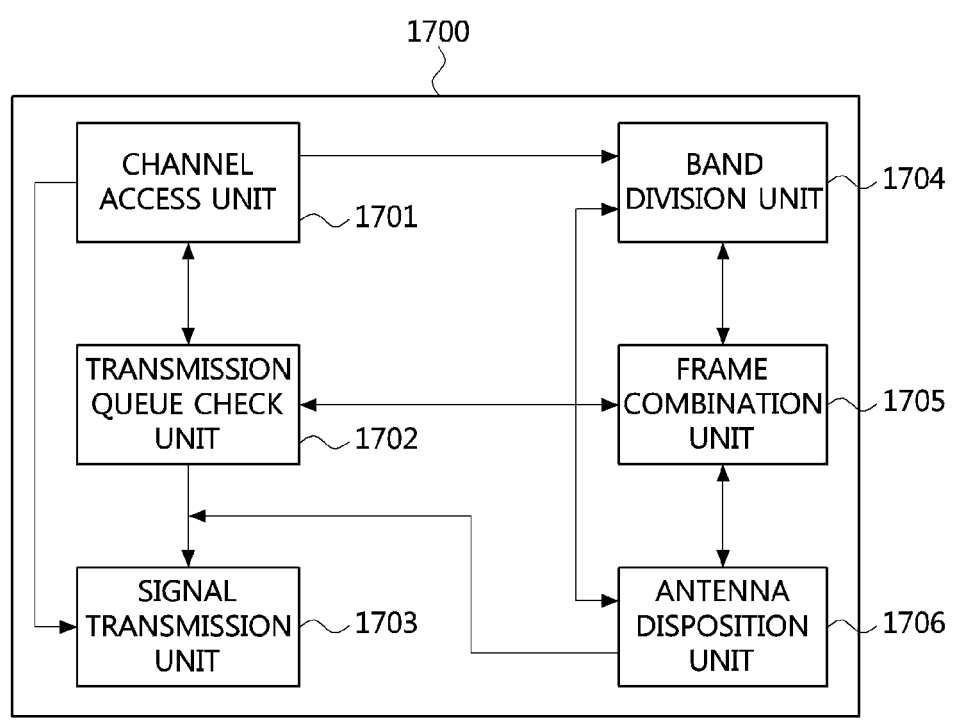
FIG. 17 is a block diagram showing the configuration of an access point (AP) according to an example embodiment of the present invention.

FIG. 17 is a block diagram showing the constitution of an AP according to an example embodiment of the present invention.

Referring to FIG. 17, an AP 1700 may include a channel access unit 1701, a transmission queue check unit 1702, a signal transmission unit 1703, a band division unit 1704, a frame combination unit 1705, and an antenna disposition unit 1706. The processor 110 described above with reference to FIG. 1 may perform functions of the channel access unit 1701, the transmission queue check unit 1702, the signal transmission unit 1703, the band division unit 1704, the frame combination unit 1705, and the antenna disposition unit 1706.

The channel access unit 1701 may attempt channel access based on the DCF or enhanced distributed channel access (EDCA). In this case, a STA that will access a channel may be determined based on an access category (AC) of a data unit, the size of a CW, and so on. When a terminal is caused to access a channel by the channel access unit 1701, the transmission queue check unit 1702 may determine whether a data unit for a terminal other than the terminal currently accessing the channel is in a transmission queue. When any data unit for a terminal other than the terminal currently accessing the channel is not in the transmission queue, the signal transmission unit 1703 may transmit a PPDU including only data units for the terminal currently accessing the channel.

On the other hand, when a data unit for a terminal other than the terminal currently accessing the channel is in the transmission queue, the band division unit 1704 may multiplex data units for the terminals in the frequency domain. Subsequently, the transmission queue check unit 1702 may determine whether a data unit for a terminal other than the terminal currently accessing the channel is in the transmission queue. When any data unit for a terminal other than the terminal currently accessing the channel is not in the transmission queue, the signal transmission unit 1703 may transmit a PPDU including the data units multiplexed in the frequency domain.

On the other hand, when a data unit for a terminal other than the terminal currently accessing the channel is in the transmission queue, the band division unit 1704 and the frame combination unit 1705 may multiplex data units for the terminals in the frequency and time domains. In other words, the frame combination unit 1705 may reconfigure a frame by adding the data unit for the other terminal to each of the subcarriers. Subsequently, the transmission queue check unit 1702 may determine whether a data unit for a terminal other than the terminal currently accessing the channel is in the transmission queue. When any data unit for a terminal other than the terminal currently accessing the channel is not in the transmission queue, the signal transmission unit 1703 may transmit a PPDU including the data units multiplexed in the frequency and time domains.

On the other hand, when a data unit for a terminal other than the terminal currently accessing the channel is in the transmission queue, the band division unit 1704, the frame combination unit 1705, and the antenna disposition unit 1706 may multiplex data units for the terminals in the frequency, time, and spatial domains. In other words, the antenna disposition unit 1706 may reconfigure a frame by multiplexing the data units for the terminals in the spatial domain. The signal transmission unit 1703 may transmit a PPDU including the data units multiplexed in the frequency, time, and spatial domains.

Thus far, methods of multiplexing data units in the time, frequency, and spatial domains have been described in detail. In an existing WLAN, only one STA occupying a channel exclusively uses the whole channel during a whole TXOP, and other STAs are required to wait during the TXOP. Also, since many STAs attempt channel access after the TXOP, the problem of a channel access delay continues. To solve these problems, the methods according to example embodiments of the present invention have been proposed.

According to example embodiments of the present invention, many STAs in one BBS may be frequently given a TXOP. For this reason, a time to wait for data transmission may be reduced, and the performance of a WLAN (e.g., communication quality and transmission stability) may be improved.

Example embodiments of the present invention may be implemented in the form of program instructions executable through various computer means and recorded in a computer-readable medium. The computer-readable medium may include program instructions, data files, data structures, etc., separately or in combination. The program instructions recorded in the computer-readable medium may be specially designed and formed for the example embodiments of the present invention, or may be known to and used by those of ordinary skill in the art of the computer software field.

The computer-readable medium may be a hardware device specially configured to store and execute program instructions, such as a ROM, a RAM, or a flash memory. The hardware device may be configured to operate as at least one software module to perform the operation according to example embodiments of the present invention, and vice versa. The program instruction may be mechanical codes as made by a compiler, as well as high-level language codes executable by a computer based on an interpreter or the like.

While the example embodiments of the present invention and their advantages have been described in detail, it should be understood that various changes, substitutions and alterations may be made herein without departing from the scope of the invention.

What is claimed is:

1. A frame transmission method performed in an access point (AP), the method comprising:
    acquiring a channel for transmitting a first data unit of a first terminal;
    when a second data unit to be transmitted to a second terminal which is associated with the AP, generating a physical layer convergence procedure (PLCP) protocol data unit (PPDU) including the first data unit and the second data unit; and
    transmitting the PPDU to the first terminal and the second terminal,
    wherein the first data unit and the second data unit are multiplexed in a frequency domain, the first data unit of the PPDU is transmitted through a first frequency channel in the frequency domain, the second data unit of the PPDU is transmitted through a second frequency channel in the frequency domain, and the PPDU includes a first identifier of the first terminal to receive the first data unit, a second identifier of the second terminal to receive the second data unit, information indicating the first frequency channel through which the first data unit is transmitted, and information indicating the second frequency channel through which the second data unit is transmitted.

2. The frame transmission method of claim 1, wherein each of the first data unit and the second data unit is a media access control (MAC) protocol data unit (MPDU) or a MAC service data unit (MSDU).

3. The frame transmission method of claim 1, further comprises:
    receiving a first acknowledgement (ACK) frame in response to reception of the first data unit included in the PPDU from the first terminal through the first frequency channel; and
    receiving a second ACK frame in response to reception of the second data unit included in the PPDU from the second terminal through the second frequency channel.

4. A frame reception method performed in a first terminal, the method comprising:
    receiving, from an access point (AP), a signal field of a physical layer convergence procedure (PLCP) protocol data unit (PPDU) including a first data unit and a second data unit which are multiplexed in a frequency domain;
    determining, based on the signal field included in the PPDU, whether the first data unit to be received by the first terminal exists in the PPDU;
    when the first data unit exists in the PPDU, obtaining, from the signal field included in the PPDU, information indicating a first frequency channel through which the first data unit is transmitted; and
    receiving the first data unit through the first frequency channel indicated by the information,
    wherein the signal field includes a first identifier of the first terminal to receive the first data unit, a second identifier of a second terminal to receive the second data unit, the information indicating the first frequency channel through which the first data unit is transmitted, and information indicating the second frequency channel through which the second data unit is transmitted.

5. The frame reception method of claim 4, wherein the first data unit of the PPDU is transmitted from the AP through the first frequency channel in the frequency domain, and the second data unit of the PPDU is transmitted from the AP through the second frequency channel in the frequency domain.

6. The frame reception method of claim 4, further comprising transmitting an acknowledgement (ACK) frame which is a response to reception of the first data unit to the AP through the first frequency channel.

7. An access point (AP), comprising:
    a processor; and
    a memory configured to store at least one command executed by the processor,
    wherein the at least one command is executable to perform operations of:
    acquiring a channel for transmitting a first data unit of a first terminal;
    when a second data unit to be transmitted to a second terminal which is associated with the AP, generating a physical layer convergence procedure (PLCP) protocol data unit (PPDU) including the first data unit and the second data unit; and
    transmitting the PPDU to the first terminal and the second terminal,
    wherein the first data unit and the second data unit are multiplexed in a frequency domain, the first data unit of the PPDU is transmitted through a first frequency channel in the frequency domain, the second data unit of the PPDU is transmitted through a second frequency channel in the frequency domain, and the PPDU includes a first identifier of the first terminal to receive the first data unit, a second identifier of the second terminal to receive the second data unit, information indicating the first frequency channel through which the first data unit is transmitted, and information indicating the second frequency channel through which the second data unit is transmitted.

8. The AP of claim 7, wherein each of the first data unit and the second data unit is a media access control (MAC) protocol data unit (MPDU) or a MAC service data unit (MSDU).

9. The AP of claim 7, wherein the at least one command is executable to further perform operations of:
   receiving a first acknowledgement (ACK) frame in response to reception of the first data unit included in the PPDU from the first terminal through the first frequency channel; and
   receiving a second ACK frame in response to reception of the second data unit included in the PPDU from the second terminal through the second frequency channel.

* * * * *